US009932092B1

(12) United States Patent
Garruto

(10) Patent No.: US 9,932,092 B1
(45) Date of Patent: Apr. 3, 2018

(54) ROLLOUT PROTECTIVE BOAT COVER ASSEMBLY AND METHOD FOR REMOVABLY AND TEMPORARILY COVERING A BOAT

(71) Applicant: Raymond John Garruto, Matthews, NC (US)

(72) Inventor: Raymond John Garruto, Matthews, NC (US)

( * ) Notice: Subject to any disclaimer, the term of this patent is extended or adjusted under 35 U.S.C. 154(b) by 89 days.

(21) Appl. No.: 15/160,072

(22) Filed: May 20, 2016

Related U.S. Application Data

(60) Provisional application No. 62/196,326, filed on Jul. 24, 2015.

(51) Int. Cl.
| B63B 17/02 | (2006.01) |
| B60J 11/02 | (2006.01) |
| E04H 15/06 | (2006.01) |
| E04H 4/10 | (2006.01) |

(52) U.S. Cl.
CPC .............. *B63B 17/02* (2013.01); *B60J 11/02* (2013.01); *E04H 4/101* (2013.01); *E04H 15/06* (2013.01); *Y10S 135/903* (2013.01)

(58) Field of Classification Search
CPC . B63B 17/00; B63B 17/02; B60J 11/00; B60J 11/02; B60J 11/025; Y10S 135/903; E04H 4/10; E04H 4/101; E04H 15/06
See application file for complete search history.

(56) References Cited

U.S. PATENT DOCUMENTS

| 2,097,923 | A | * | 11/1937 | Hutchinson | B60J 11/02 135/88.08 |
| 2,724,395 | A | | 11/1955 | Valentine | |
| 3,222,102 | A | | 12/1965 | Lucas | |
| 4,363,284 | A | | 12/1982 | Monroe | |
| 4,641,600 | A | * | 2/1987 | Halvorsen | B63B 17/02 114/202 |
| 4,856,842 | A | * | 8/1989 | Ross | B60J 11/02 150/166 |
| 6,070,629 | A | * | 6/2000 | Whiteside | B60J 11/00 150/166 |
| 6,513,858 | B1 | | 2/2003 | Li et al. | |
| 6,964,446 | B2 | | 11/2005 | Porter | |
| 7,093,558 | B1 | * | 8/2006 | Mandanici | B63B 17/02 114/361 |
| 7,464,982 | B1 | | 12/2008 | Lin et al. | |
| 8,246,066 | B1 | | 8/2012 | Allen et al. | |
| 8,286,651 | B1 | | 10/2012 | Maffett | |
| 8,608,223 | B2 | | 12/2013 | Taylor et al. | |
| 2014/0093346 | A1 | | 4/2014 | Kent | |
| 2014/0261934 | A1 | | 9/2014 | Abeyta | |

* cited by examiner

*Primary Examiner* — Ajay Vasudeva
(74) *Attorney, Agent, or Firm* — Schwartz Law Firm, P.C.

(57) ABSTRACT

A rollout protective cover assembly is configured for removably and temporarily covering a boat. The cover assembly includes a reel, and a flexible cover attached to the reel and having opposing sides and opposing ends. The flexible cover is adapted for being rolled onto the reel in a stowed condition and substantially unrolled from the reel in a deployed condition over the boat. The opposing sides of the flexible cover define symmetrically formed scalloped edges. Each scalloped edge includes a series of longitudinally spaced tie-down projections and a corresponding series of concave ventilation curves formed between adjacent projections.

13 Claims, 11 Drawing Sheets

ROLLOUT PROTECTIVE BOAT COVER ASSEMBLY AND METHOD FOR REMOVABLY AND TEMPORARILY COVERING A BOAT

TECHNICAL FIELD AND BACKGROUND OF THE DISCLOSURE

The present disclosure relates broadly and generally to a rollout protective cover and method for covering and protecting an outdoor article. In exemplary applications, the present rollout cover offers a quick and convenient solution for covering any type of recreational water craft, other vehicle or article.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a rollout protective cover assembly for removably and temporarily covering a boat (or other land or water vehicle). The exemplary cover assembly comprises a reel, and a flexible cover attached to the reel, and having opposing sides and opposing ends. The flexible cover is adapted for being rolled (or wound) onto the reel in a stowed condition and substantially unrolled (or unwound) from the reel in a deployed condition over the boat. The opposing sides of the flexible cover define symmetrically formed scalloped edges. Each scalloped edge comprises a series of longitudinally spaced tie-down projections and a corresponding series of concave ventilation curves formed between adjacent projections.

According to another exemplary embodiment, the flexible cover is constructed of a fabric selected from a group consisting of polyester and acrylic.

According to another exemplary embodiment, the scalloped edge at each side of the flexible cover comprises at least three equally spaced tie-down projections.

According to another exemplary embodiment, each ventilation curve has an arc length between about 36 and 42 inches. Additionally, each ventilation curve may have a maximum depth of about 6 inches—as measured inwardly from and perpendicular to a notional straight line extending between adjacent projections (point-to-point).

According to another exemplary embodiment, each tie-down projection defines a strap opening (e.g., eyelet) adapted for receiving a flexible tie-down strap.

According to another exemplary embodiment, a metal grommet is located at each strap opening.

According to another exemplary embodiment, the reel comprises an elongated rotatable reel cylinder.

According to another exemplary embodiment, a proximal end of the flexible cover is fastened to the reel cylinder.

According to another exemplary embodiment, a hand crank is adapted for rotating the reel cylinder to roll the flexible cover thereon—thereby returning the flexible cover from the deployed condition over the boat to the stowed condition.

According to another exemplary embodiment, first and second mounting anchors are located at opposite ends of the reel cylinder, and are adapted for mounting the cover assembly on a boat pier (or other supporting structure).

According to another exemplary embodiment, a distal end of the flexible cover is adapted for being grasped and pulled by a user to unroll the flexible cover from the stowed condition on said reel to the deployed condition over the boat.

According to another exemplary embodiment, the cover assembly comprises an elongated horizontally-disposed hanger beam carrying the reel and the flexible cover.

According to another exemplary embodiment, the hanger beam comprises a plurality of spaced apart rail hooks adapted for hanging the cover assembly from a rail of the boat.

In another exemplary embodiment, the present disclosure comprises a rollout protective cover assembly for removably and temporarily covering a boat (or other land or water vehicle). The cover assembly comprising a reel and a flexible cover attached to the reel. The flexible cover has opposing sides and opposing ends. The flexible cover is adapted for being rolled onto the reel in a stowed condition and substantially unrolled from the reel in a deployed condition over the boat. An elongated horizontally-disposed hanger beam carries the reel and the flexible cover. A plurality of spaced rail hooks are attached to the hanger beam and are adapted for hanging the cover assembly from a rail of the boat.

In yet another exemplary embodiment, the present disclosure comprises a method for removably and temporarily covering a boat. The method comprises hanging a horizontally-disposed hanger beam from a rail of the boat. The hanger beam carries a cover assembly comprising a reel and a flexible cover. The flexible cover is then unrolled from a stowed condition on the reel to a deployed condition over the boat.

BRIEF DESCRIPTION OF THE DRAWINGS

Exemplary embodiments of the present disclosure will hereinafter be described in conjunction with the following drawing figures, wherein like numerals denote like elements, and wherein:

FIGS. 8, 8A, and 8B show the exemplary cover assembly applied to the boat and secured using various tie-down straps;

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
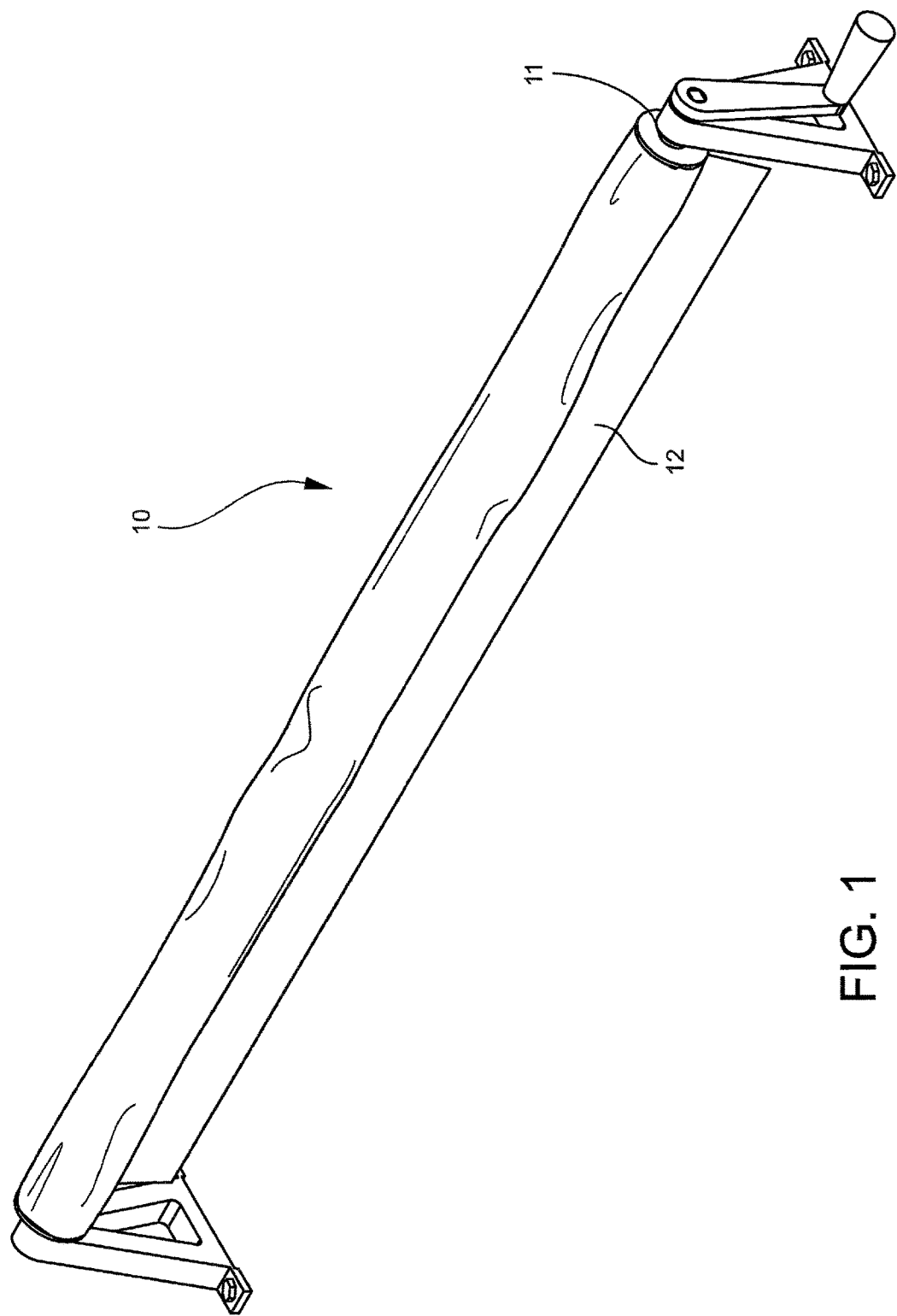
FIG. 1 is a perspective view of a protective boat cover assembly according to one exemplary embodiment of the present disclosure.

Referring now specifically to the drawings, a rollout protective boat cover assembly according to one exemplary embodiment of the present disclosure is illustrated in FIG. 1, and indicated at broad reference numeral 10. The exemplary cover assembly 10 is configured to removably and temporarily cover the open top of a boat "B" (FIG. 2), such as a standard pontoon or deck boat, and may be used when docking the boat at a pier, for longer term dry storage, and during trailer transport. In alternative applications, the exemplary cover assembly 10 may also be used for land vehicles and other water vessels, such as sail boats, canoes, jet skis, and other motorized and non-motorized watercraft.

Figure 2:
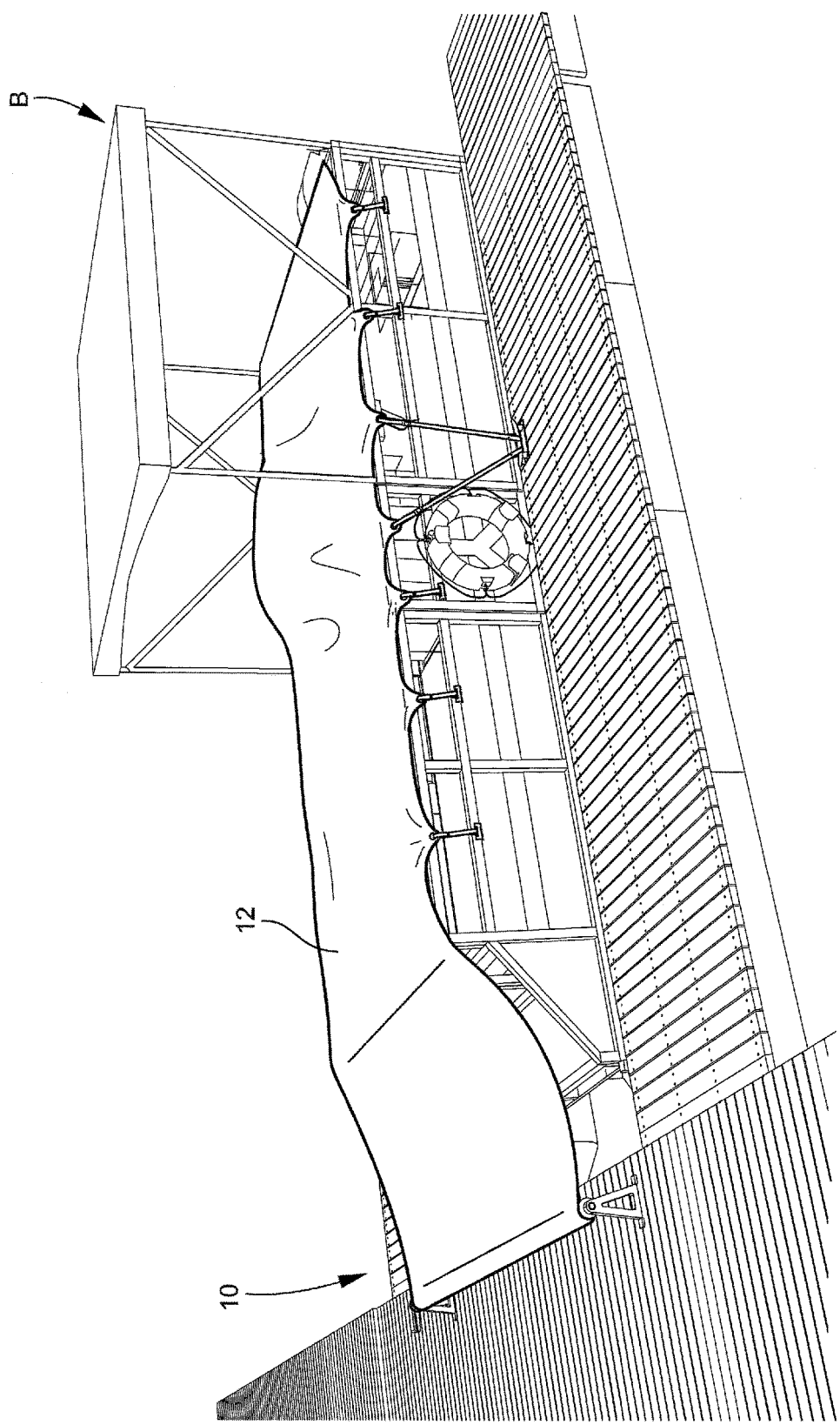
FIG. 2 is a view of the exemplary cover assembly in a deployed condition over a boat.
Figure 3:
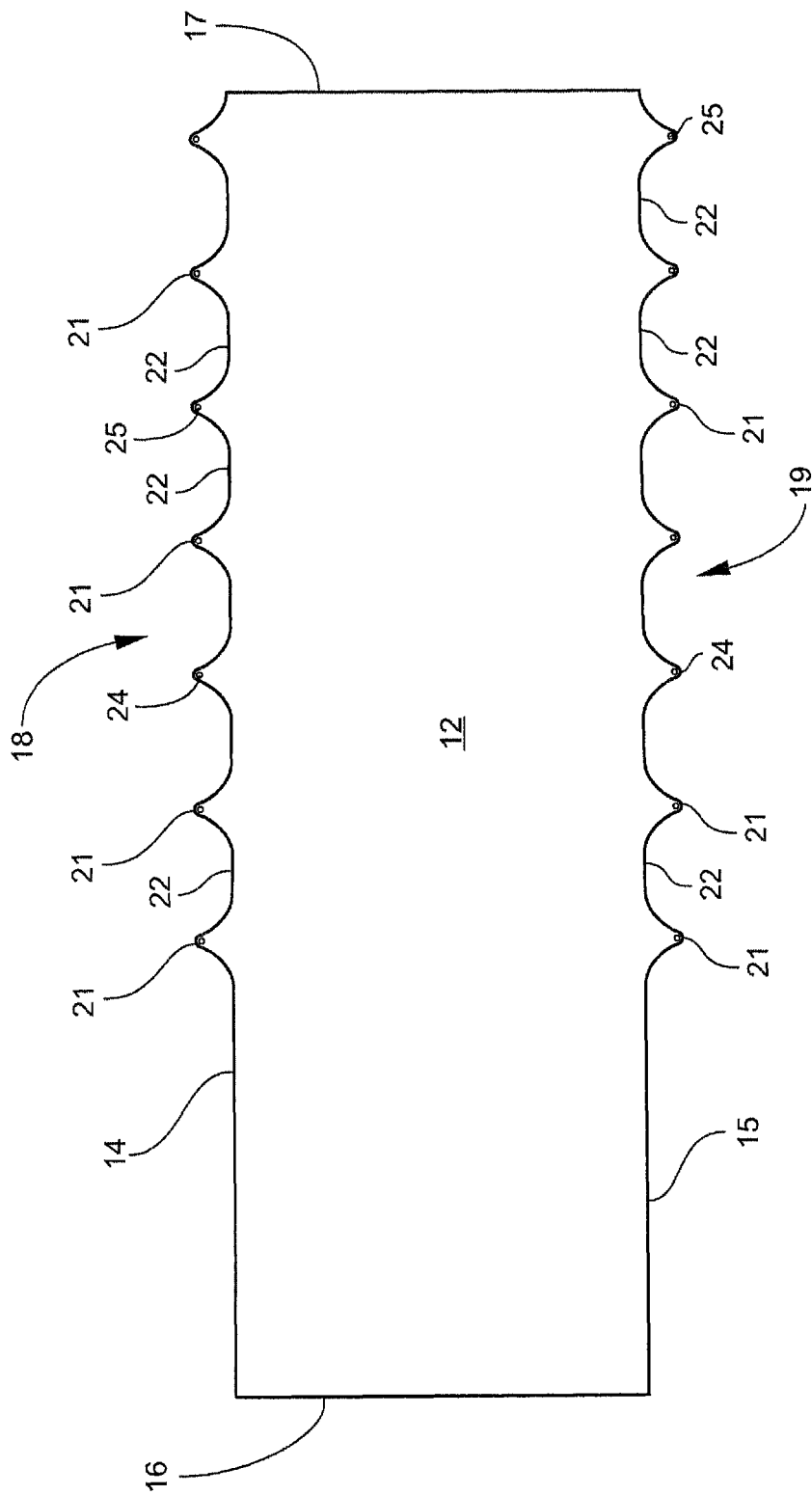
FIG. 3 is a plan view of the fabric cover separated from the reel and laid flat.

Referring to FIGS. 1, 2, and 3, the present boat cover assembly 10 comprises a reel 11, and a flexible cover 12 attached to the reel 11. The flexible cover 12 is adapted for being rolled onto the reel 11 in a stowed condition, as shown in FIG. 1, and substantially unrolled from the reel 11 in a deployed condition over the boat "B", as shown in FIG. 2. The exemplary cover 12 has opposing sides 14, 15 and ends 16, 17, and is constructed of a seamless reflective fabric, such as polyester, acrylic, cotton/poly blend, or the like. In one exemplary embodiment, the fabric cover 12 comprises a seamless, 100% marine-grade, water repellant and breathable, 8-oz polyester which is treated for UV and mildew resistance. As best shown in FIG. 3, the opposing sides 14, 15 of the flexible cover 12 define symmetrically formed scalloped edges 18, 19. Each scalloped edge 18, 19 comprises a series of longitudinally spaced perimeter tie-down projections 21, and a corresponding series of perimeter concave ventilation curves 22 formed between adjacent projections 21. The exemplary flexible cover 12 has seven (7) tie-down projections 21 and six (6) ventilation curves 22 which are symmetrically formed on each side 14, 15. Each ventilation curve 22 has an arc length between about 36 and 42 inches, while each tie-down projection 21 defines a strap opening 24 (e.g., eyelet) adapted for receiving a flexible tie-down strap. The strap openings 24 are reinforced with metal grommets 25 (FIG. 8A). The metal grommets 25 may be spaced about 12-18 inches apart, and may also be located along a front distal edge of the cover 12.

When the flexible cover 12 is deployed over a top of the boat "B", as shown in FIG. 2, the ventilation curves 22 enable substantial air flow and circulation throughout the covered and protected interior of the boat. One or more height-adjustable support poles (not shown) or other such accessory may be used to aid in breathability, and to allow water and debris to easily run off the cover 12.

Figure 4:
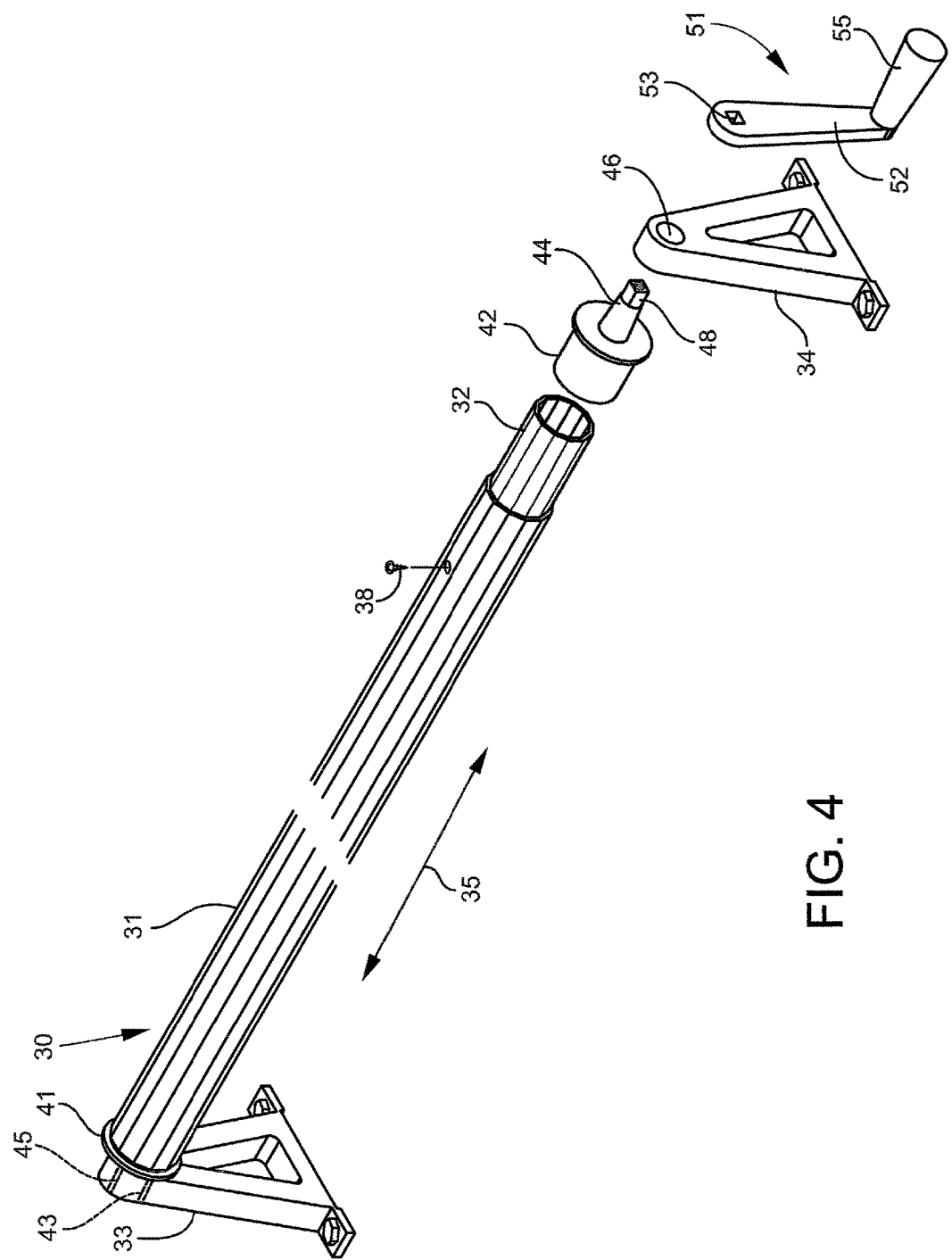
FIG. 4 is an exploded view of the exemplary reel.
Figure 5:
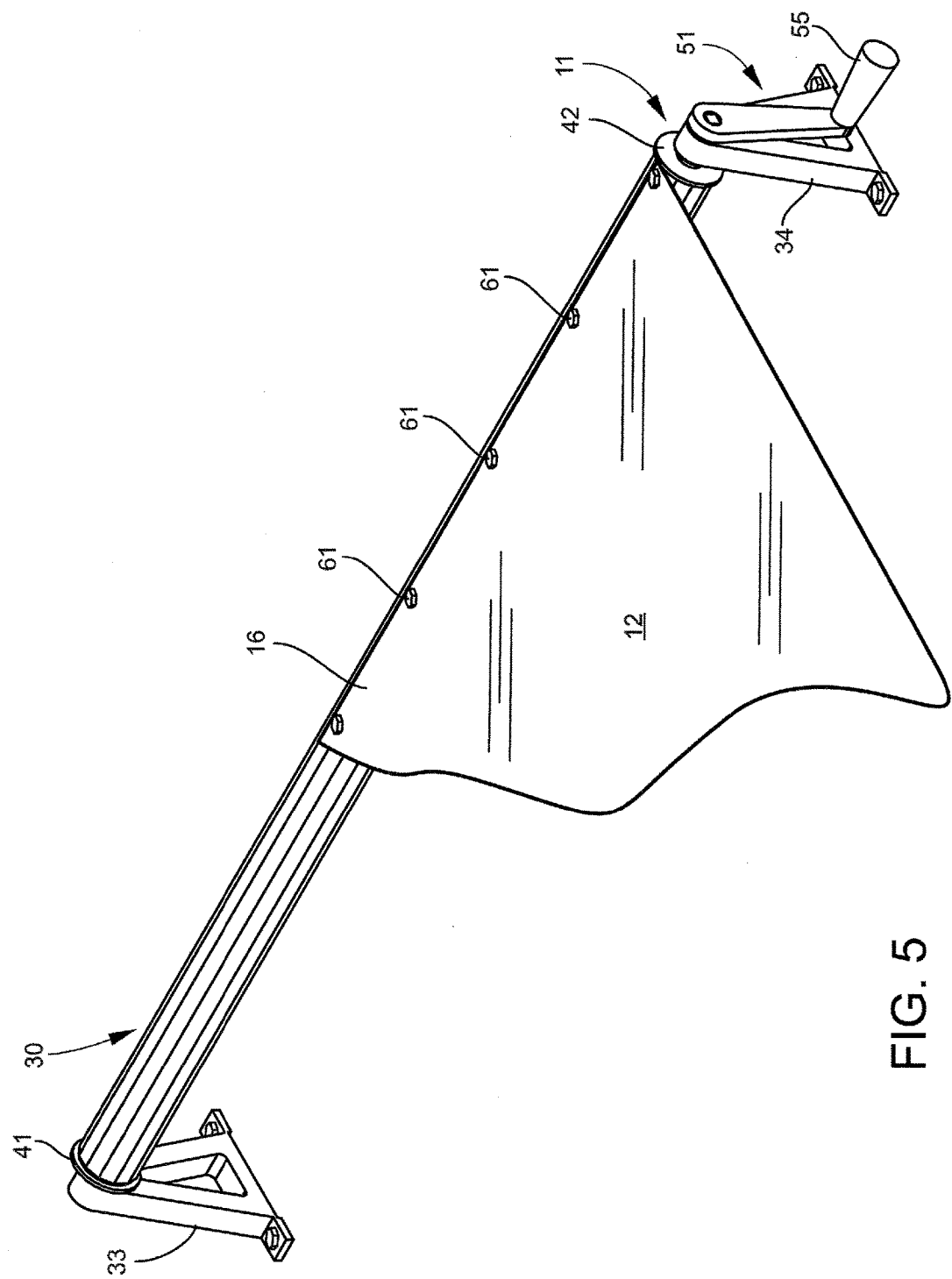
FIG. 5 is a perspective view of the reel showing a fragmentary portion of the flexible cover.
Figure 6:
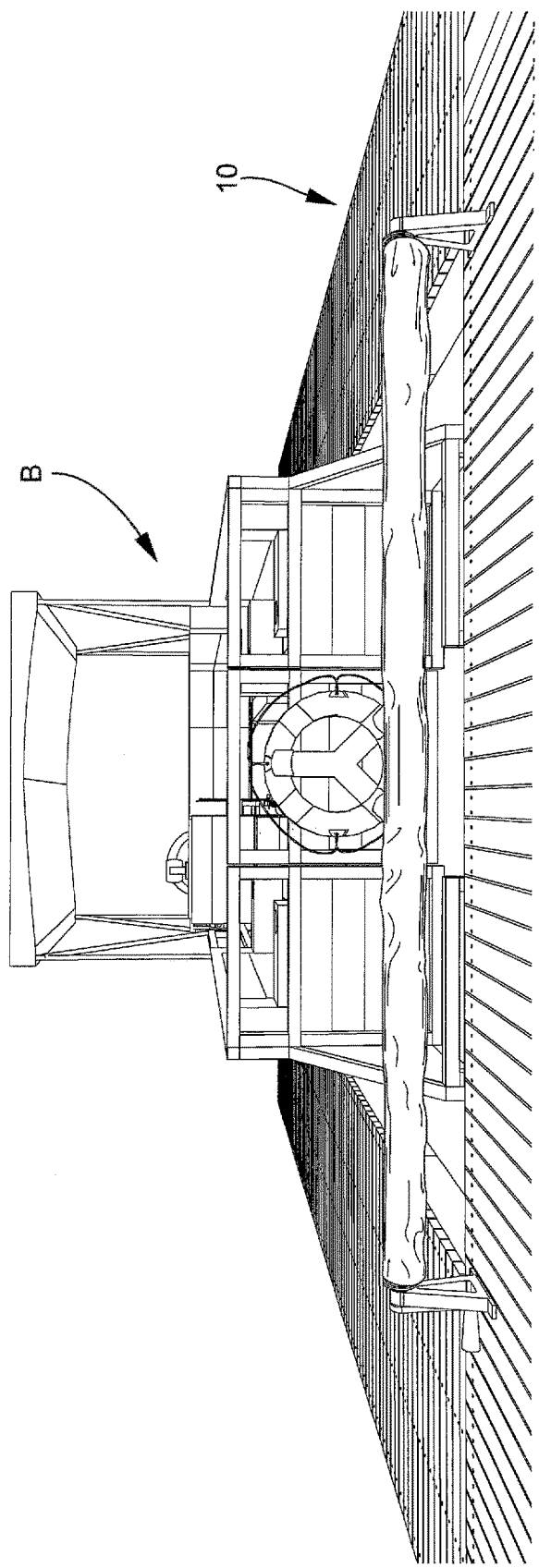
FIGS. 6 and 7 are environmental views of the exemplary boat cover assembly.

Referring to FIGS. 4 and 5, the exemplary reel 11 of the cover assembly 10 comprises an elongated adjustable reel cylinder 30 incorporating hollow telescoping aluminum sections 31, 32 carried between spaced apart mounting anchors 33, 34. The exemplary mounting anchors 33, 34 are designed for being permanently affixed to a dock surface— e.g., at a main pier between two spaced finger piers (FIG. 6). The telescoping sections 31, 32 allow the reel cylinder 30 to be custom lengthened, as indicated in FIG. 4 at arrow 35, to match the span of the pier slip and the selected lateral dimension of the flexible cover 12. The length of reel cylinder 30 may be adjusted between 8 ft-18 ft, and may be fixed using one or more self-tapping screws 38 or other hardware. Journal caps 41, 42 are located at opposite ends of the reel cylinder 30, and comprise respective distal shafts 43, 44 which extend into openings 45, 46 (bearings) of the first and second mounting anchors 33, 34. A solid square head 48 is formed with the distal shaft 44 of journal cap 42, and extends outwardly through the opening 46 of mounting anchor 34. A crank 51 is located outside of mounting anchor 34, and comprises an arm 52 defining a complementary boxed socket 53 which receives the outward-projecting square head 48 of journal cap 42. A crank handle 55 is formed perpendicular to the crank arm 52, and when manually turned causes the reel cylinder 30 to turn about a notional axis extending between and through the distal shafts 43, 44.

Figure 7:
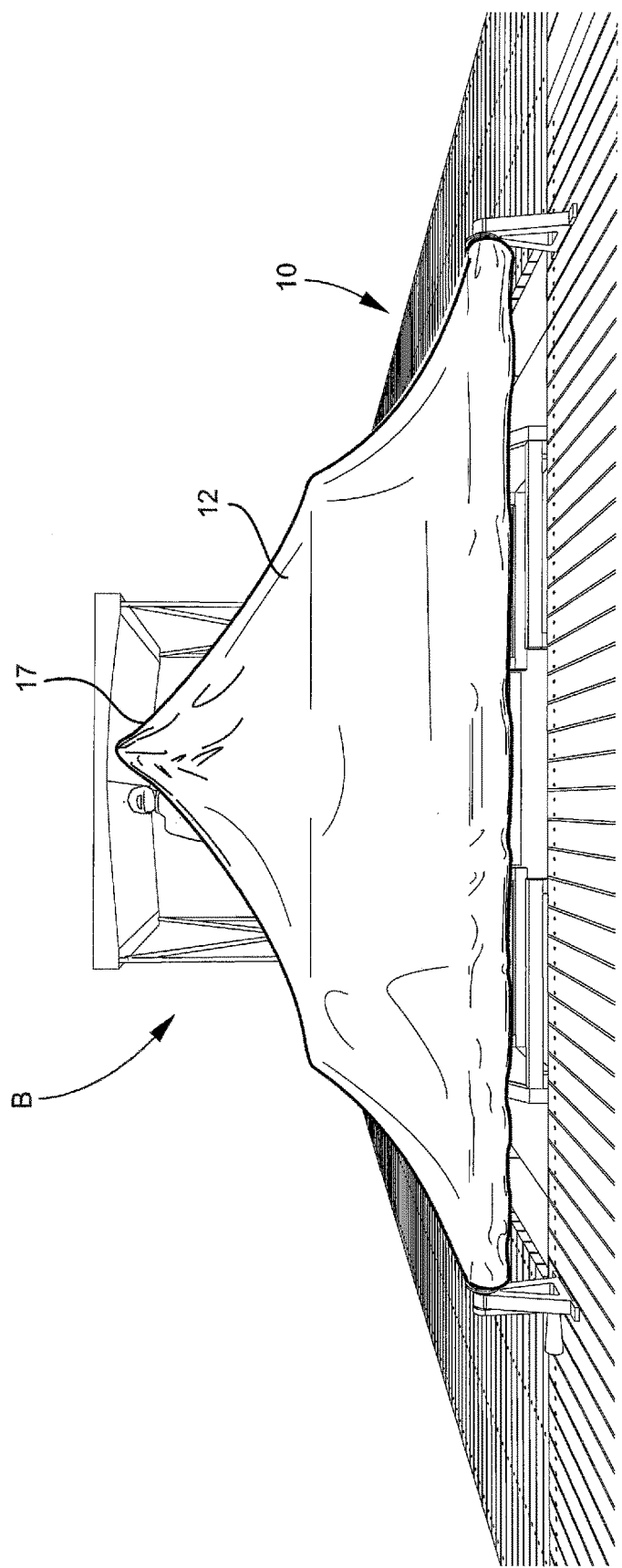

After length adjusting and mounting the reel cylinder 30, as previously described, the proximal end 16 of the flexible cover 12 is attached to the reel cylinder 30 using spaced apart tap screws 61 or other means, such as adhesive, tape, staples, hook and loop fasteners, snaps, or the like. The tap screws 61 may be spaced 8-10 inches apart along the entire adjusted length of the reel cylinder 30. The flexible cover 12 is then rolled up onto the reel cylinder 30 by turning the crank handle 55 in either a clockwise or counterclockwise direction. From this stowed condition shown in FIG. 6, the flexible cover 12 may be readily deployed by grasping its distal end 17 and pulling the cover 12 over the boat "B" as demonstrated in FIG. 7.

Figure 8:
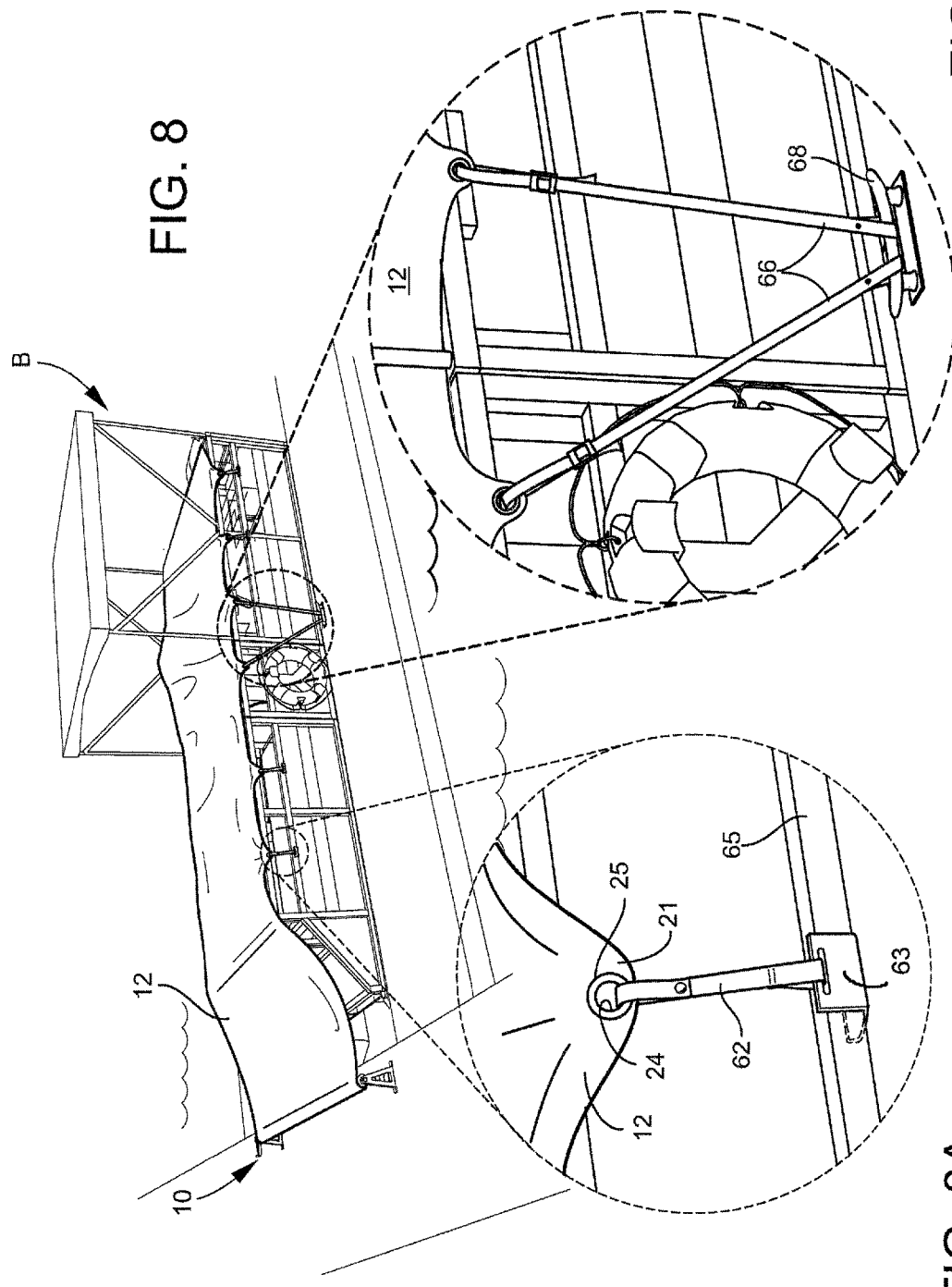
Figure 9:
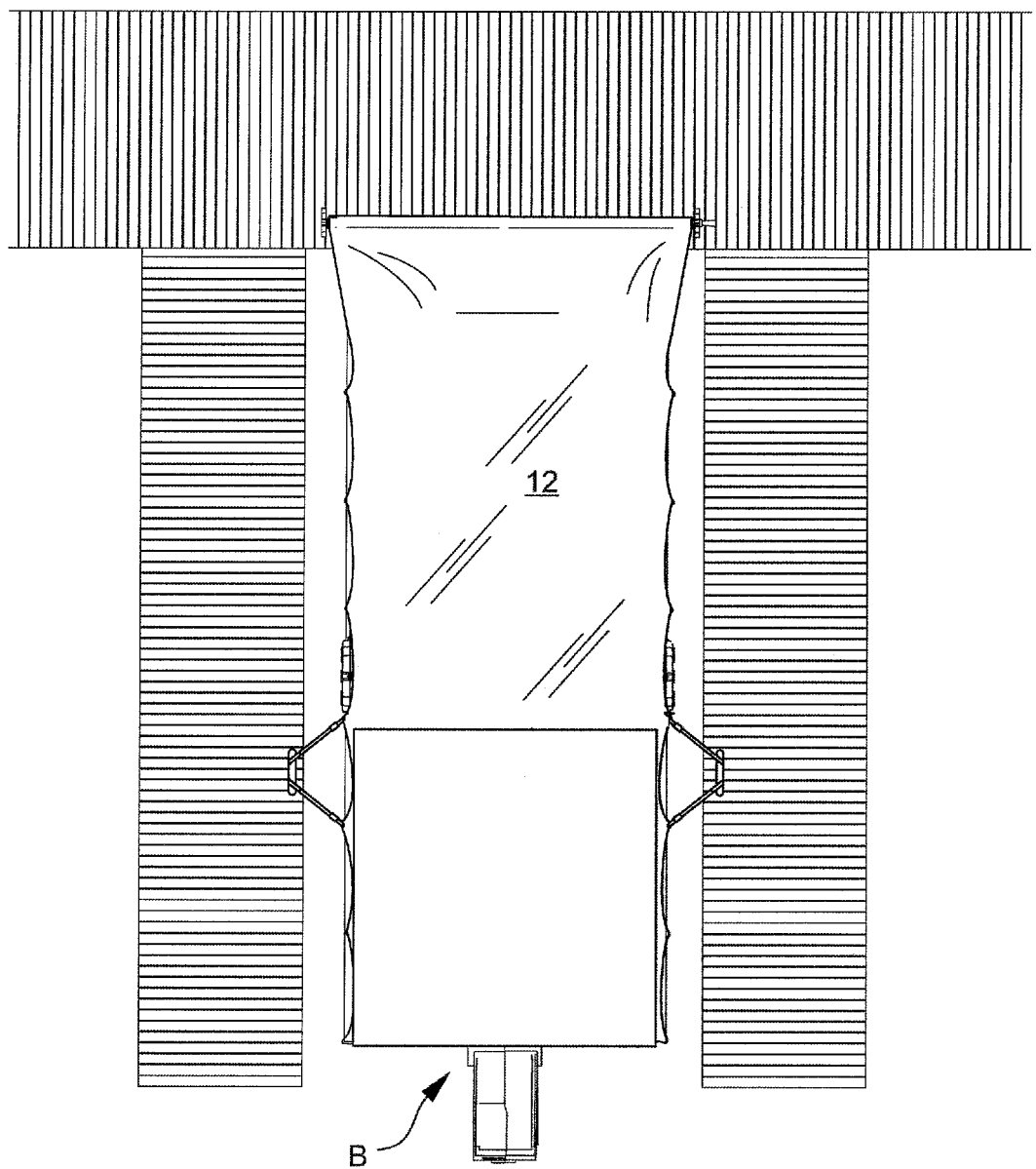
FIG. 9 is an environmental plan view of the exemplary cover assembly applied to the boat.

Referring to FIGS. 8, 8A, 8B and 9, flexible tie-down straps inserted through respective strap openings in the tie-down projections 21 releasably attach to boat rails and/or the dock, and cooperate to secure the flexible cover 12 in position over the boat "B". FIG. 8A illustrates an exemplary tie-down strap 62 and fastener plate 63 for securing a portion of the cover 12 to the boat rail 65. FIG. 8B illustrates alternative adjustable tie-down straps 66 for securing portions of the cover 12 to a dock anchor 68. Exemplary tie-down straps may include a variety of releasable fasteners such as button snaps, hooks, and hook-and-loop, and may be fabricated in any desired length and material (including nylon, bungee cord, and others). FIG. 9 illustrates the flexible cover 12 applied to the boat "B", and fully secured to the boat rails and dock. A single short strap (not shown) may be used to secure the crank handle to the mounting anchor, thereby preventing the crank from inadvertently turning so that proper tension is maintained when the cover is deployed. The cover 12 is readily removed by releasing and removing the tie-down straps, and then using the crank handle to roll the cover back onto the reel into the stowed condition. In alternative embodiments, a small electric motor (or other mechanical or electro-mechanical means) may be employed to automatically rotate the reel and return the cover to the stowed condition.

Figure 10:
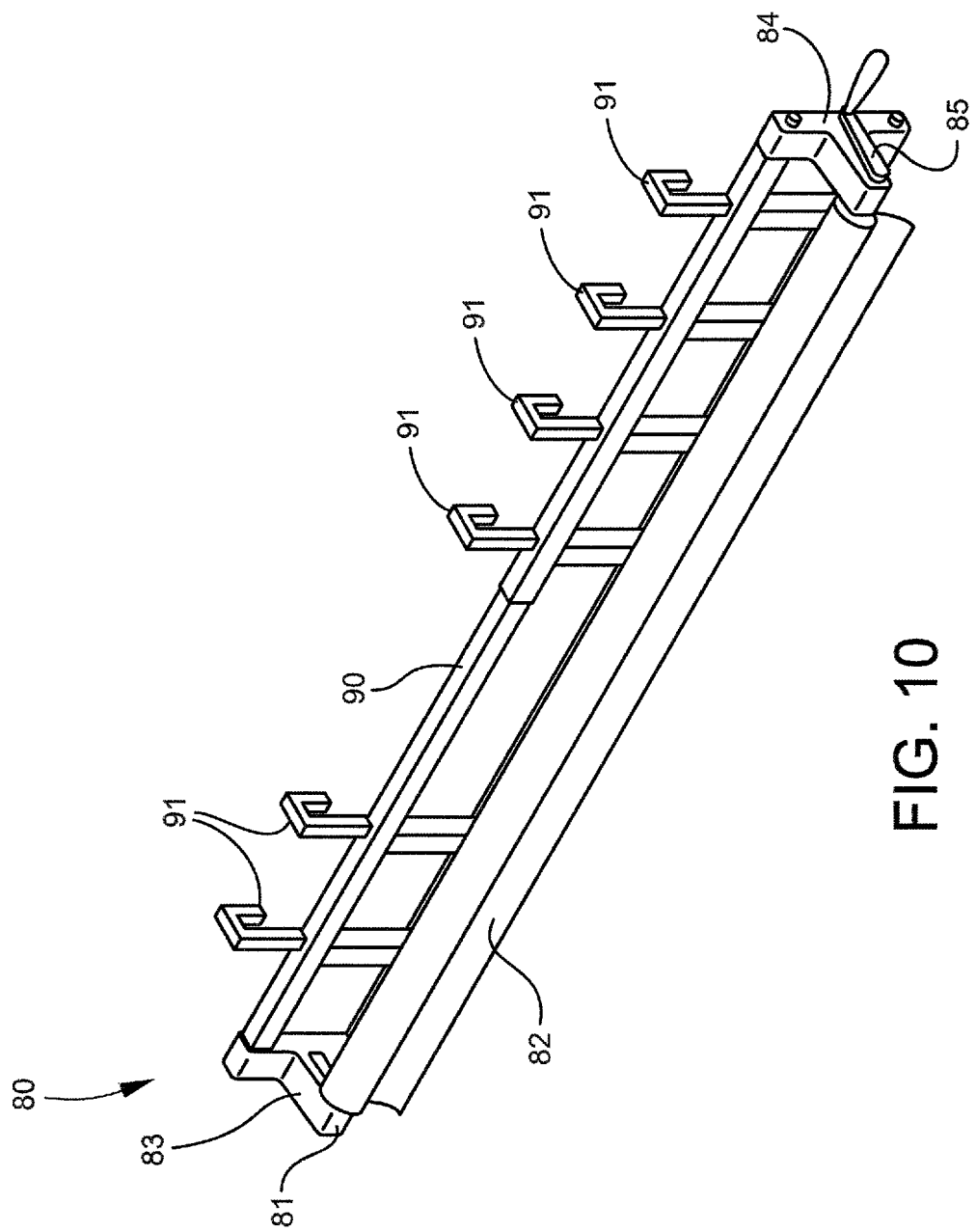
FIG. 10 is a perspective of a protective boat cover assembly according to an alternative exemplary embodiment of the present disclosure.
Figure 11:
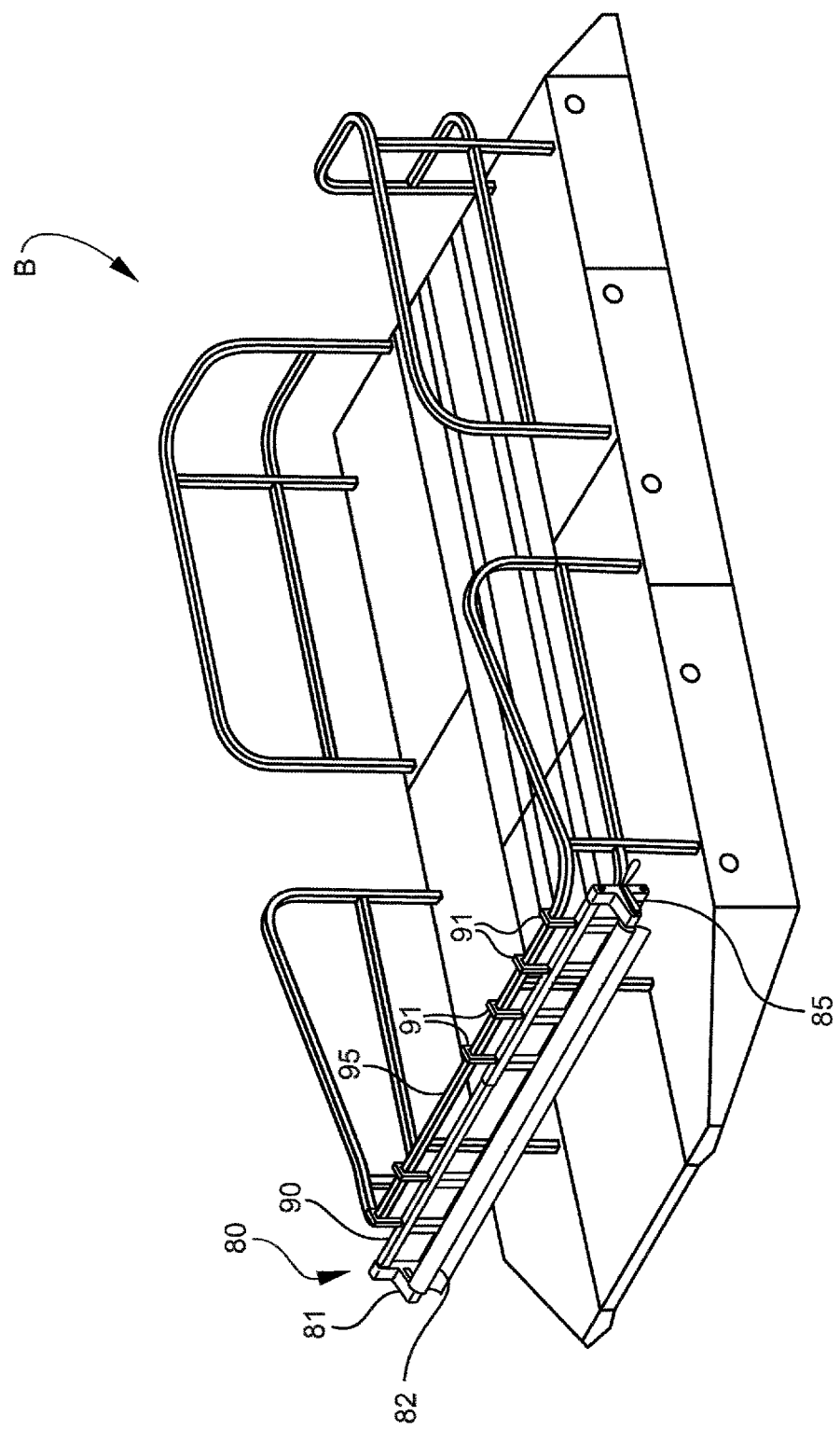
FIG. 11 shows the exemplary cover assembly removably hung from a back rail of the boat.

A further exemplary embodiment of the present boat cover assembly 80 is illustrated in FIGS. 10 and 11. Like the assembly 10 described above, the boat cover assembly 80 comprises a reel 81 and a flexible cover 82 attached to the reel 81. The flexible cover 82 is adapted for being rolled onto the reel 81 in a stowed condition, and substantially unrolled from the reel 81 in a deployed condition over the boat "B". The structure and construction of the reel 81 and cover 82 may be identical to that previously described. Alternatively, the flexible cover 82 may comprise a substantially rectangular fabric sheet with generally straight (verses scalloped) side edges. The exemplary cover 82 may comprise metal grommets spaced about 12-18 inches apart along side and distal edges for receiving flexible tie-down straps. The tie-down straps cooperate in the manner described above to secure the cover to the boat and dock.

The exemplary reel 81 of cover assembly 80 comprises an elongated adjustable reel cylinder incorporating hollow telescoping aluminum sections identical to that previously described. The reel cylinder is rotatably carried between spaced apart T-shaped mounting ends 83, 84, and includes the journal end caps (not shown) and crank 85 of cover assembly 10. The mounting ends 83, 84 are attached to an elongated adjustable-length hanger beam 90. The hanger beam 90 carries the reel 81 and flexible cover 82, and comprises a number of spaced apart rail hooks 91 configured to removably hang the cover assembly 80 from a rail 95 of the boat "B", as shown in FIG. 11. From this position, the flexible cover 82 may be readily deployed by grasping its distal end and pulling the cover 82 over the boat "B". The crank 85 may be subsequently used to roll the cover 82 back onto the reel 81 into the stowed condition. In further alternative embodiments, the cover assembly 80 may be permanently installed in the boat or other vehicle.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed is:

1. A rollout protective cover assembly for removably and temporarily covering a boat, said cover assembly comprising:
   a reel;
   a flexible cover attached to said reel, and having opposing sides and opposing ends, and said flexible cover adapted for being rolled onto said reel in a stowed condition and substantially unrolled from said reel in a deployed condition over the boat; and
   the opposing sides of said flexible cover defining symmetrically formed scalloped edges, each scalloped edge comprising a series of longitudinally spaced tie-down projections and a series of concave ventilation curves formed between adjacent projections.

2. The rollout protective cover assembly according to claim 1, wherein said flexible cover is constructed of a fabric selected from a group consisting of polyester and acrylic.

3. The rollout protective cover assembly according to claim 1, wherein the scalloped edge at each side of said flexible cover comprises at least three equally spaced tie-down projections.

4. The rollout protective cover assembly according to claim 1, wherein each ventilation curve has an arc length between about 36 and 42 inches.

5. The rollout protective cover assembly according to claim 1, wherein each tie-down projection defines a strap opening adapted for receiving a flexible tie-down strap.

6. The rollout protective cover assembly according to claim 5, and comprising a metal grommet located at each strap opening.

7. The rollout protective cover assembly according to claim 1, wherein said reel comprises an elongated rotatable reel cylinder.

8. The rollout protective cover assembly according to claim 7, wherein a proximal end of said flexible cover is fastened to said reel cylinder.

9. The rollout protective cover assembly according to claim 8, and comprising a hand crank adapted for rotating said reel cylinder.

10. The rollout protective cover assembly according to claim 9, and comprising first and second mounting anchors located at opposite ends of said reel cylinder, and adapted for mounting said cover assembly on a boat pier.

11. The rollout protective cover assembly according to claim 1, wherein a distal end of said flexible cover is adapted for being grasped and pulled by a user to unroll said flexible cover from the stowed condition on said reel to the deployed condition over the boat.

12. The rollout protective cover assembly according to claim 1, and comprising an elongated horizontally-disposed hanger beam carrying said reel and said flexible cover.

13. The rollout protective cover assembly according to claim 12, wherein said hanger beam comprises a plurality of spaced apart rail hooks adapted for hanging said cover assembly from a rail of the boat.

\* \* \* \* \*